United States Patent [19]

Barradas et al.

[11] Patent Number: 4,953,295
[45] Date of Patent: Sep. 4, 1990

[54] SEAWATER HYDRAULIC BAND SAW

[75] Inventors: Scott Barradas, Oxnard; Bruce Farber, Oak View; William B. Luther, Oceanside, all of Calif.

[73] Assignee: The United States of America as represented by the Secretary of the Navy, Washington, D.C.

[21] Appl. No.: 479,490

[22] Filed: Feb. 2, 1990

[51] Int. Cl.$^5$ .............................................. B27B 13/08
[52] U.S. Cl. ......................................... 30/380; 83/816
[58] Field of Search .................... 30/280, 274; 83/816, 83/818

[56] References Cited

U.S. PATENT DOCUMENTS

| | | | |
|---|---|---|---|
| 2,596,081 | 5/1952 | Sacrey. | |
| 2,969,815 | 1/1961 | Lasar. | |
| 3,829,970 | 8/1974 | Anderson | 30/380 |
| 4,001,937 | 1/1977 | Stelljes et al. | 30/380 |
| 4,376,620 | 3/1983 | Colston | 418/79 |

OTHER PUBLICATIONS

Technical Manual for *Portable Hydraulic Bandsaw*, Civil Eng. Lab. Naval Const. Bat. Ctr., Port Hueneme, Calif. 93043, Dec. 1977.

*Primary Examiner*—Douglas D. Watts
*Attorney, Agent, or Firm*—David S. Kalmbaugh

[57] ABSTRACT

A seawater powered band saw having a rigid frame or housing, a control handle and valve assembly having a trigger which when engaged by an operator delivers pressurized seawater to a seawater powered vane motor, a novel seawater lubricated spur and pinion gear drive arrangment connecting the vane motor in a driving relationship to a band saw drive wheel, an idler take-up assembly to tension the saw blade and facilitate the changing of saw blades and a safety guard assembly to protect the blade when the band saw is non-operational and protect the operator when the band saw is operational.

16 Claims, 4 Drawing Sheets

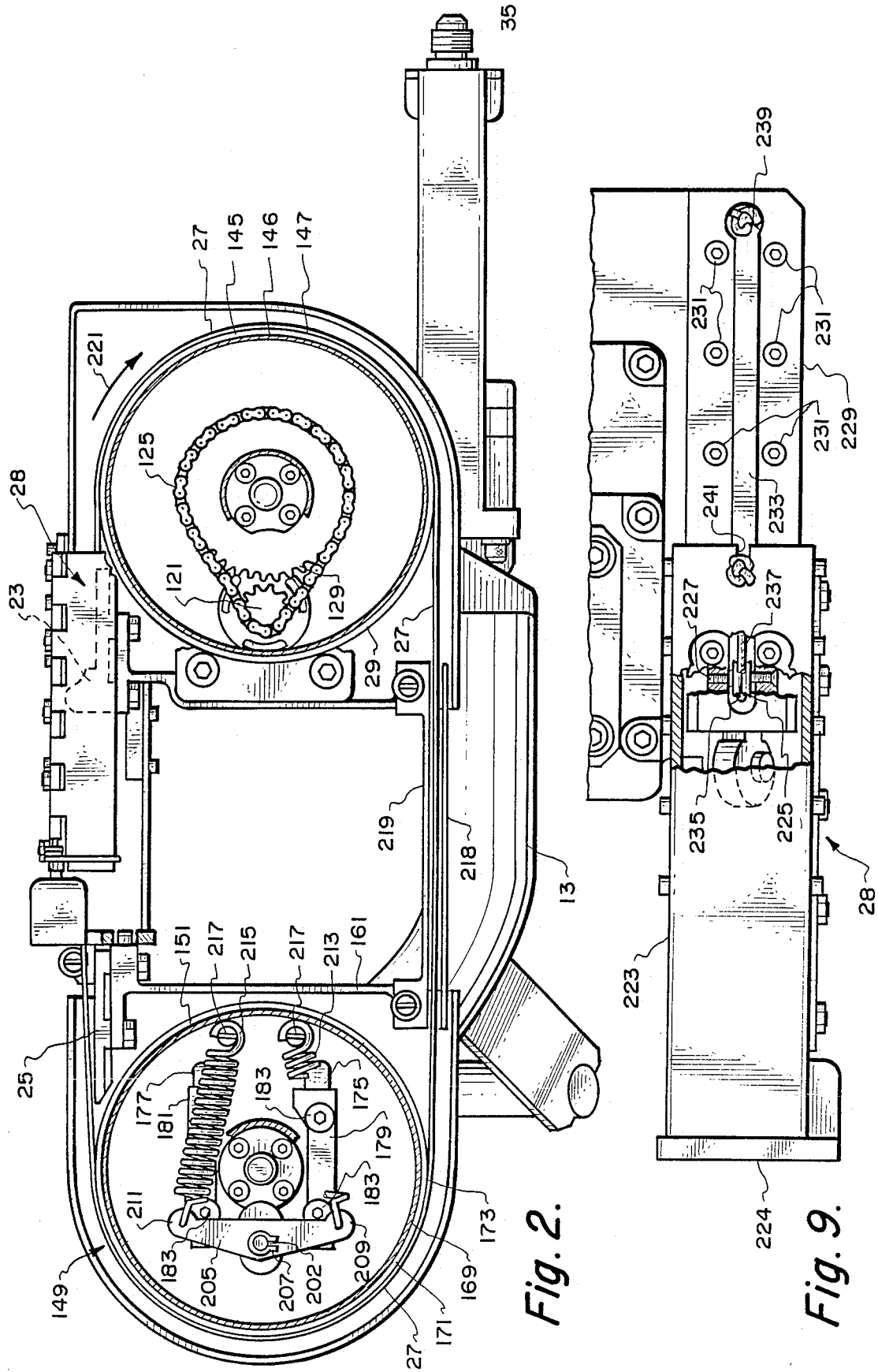

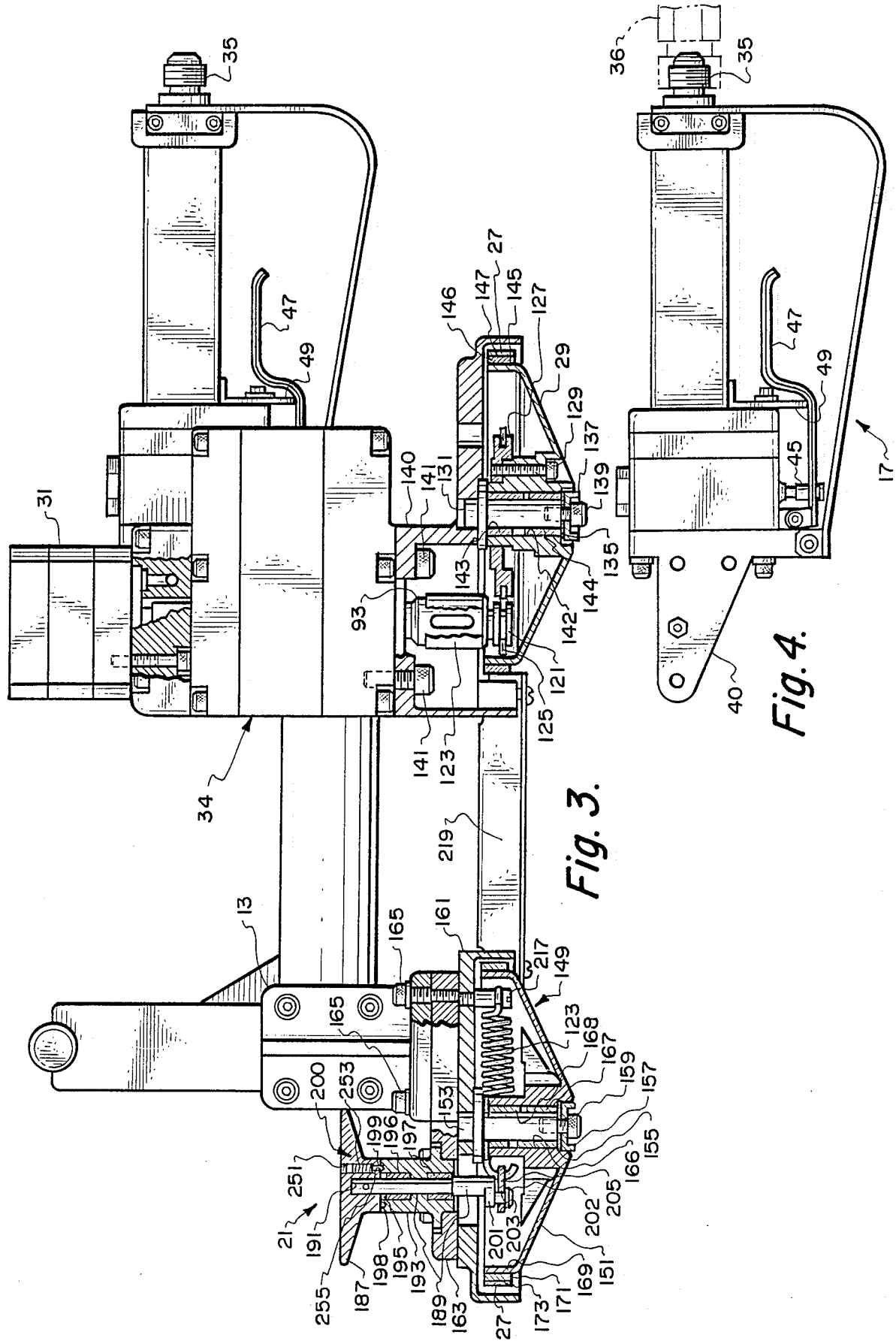

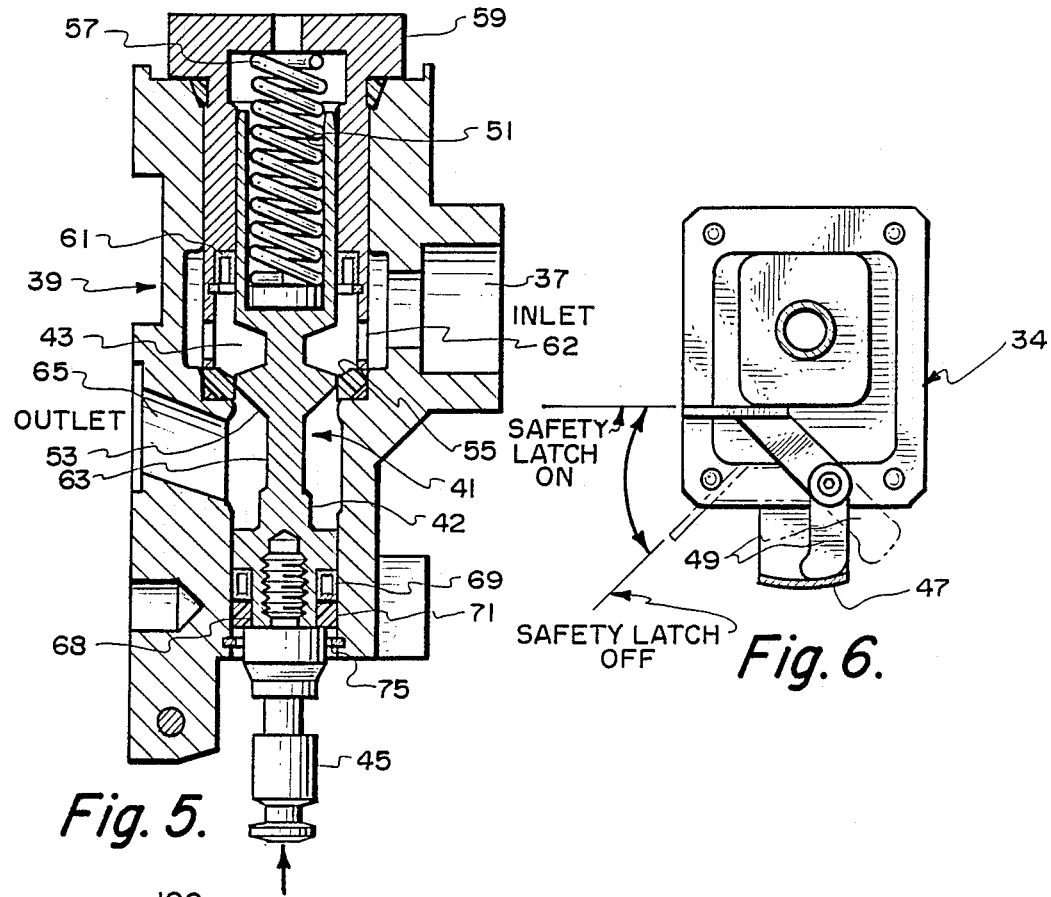
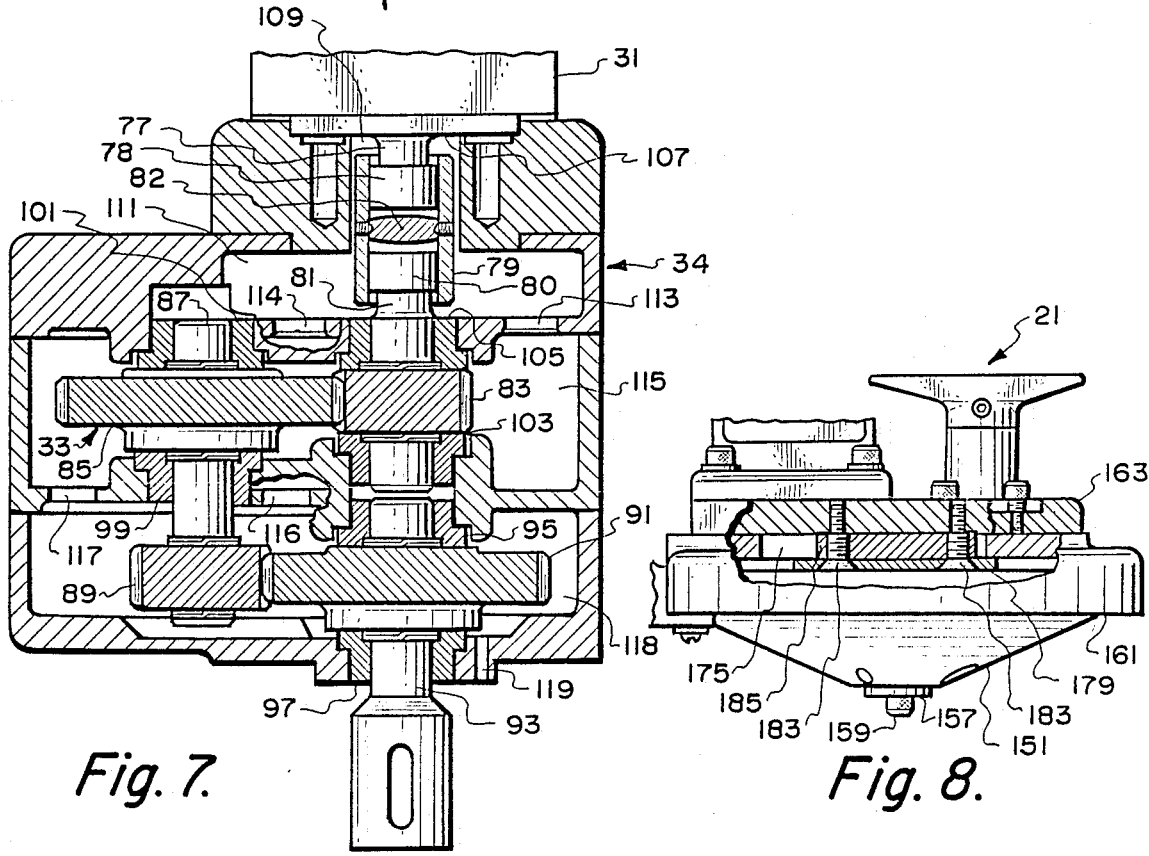

SEAWATER HYDRAULIC BAND SAW

1. BACKGROUND OF THE INVENTION

This invention relates generally to hydraulic tools. In particular, this invention relates to a band saw in which seawater is used as the hydraulic fluid.

2. DESCRIPTION OF THE PRIOR ART

Prior art band saws typically are designed for outdoor construction or other open air work and are generally electrically powered.

One such prior art band saw is described in U.S. Pat. No. 4,001,937 to Charles R. Stelljes and Lars Frostad. Disclosed therein is a portable band saw which has a unitary, rigid frame, a blade tensioning mechanism, and a drive arrangement whereby the motor is located out of the way of the work and spur gears are utilized as an integral component of the drive arrangement.

A second such prior art band saw is described in U.S. Pat. No. 3,829,970 to Martin P. Anderson. Disclosed therein is a portable electric band saw which includes a compression spring tensioner which is activated when the blade of the band saw becomes fully tight.

While these prior art band saws function adequately in an outdoor construction or other open air environment, these electrically powered prior art band saws would not function in an underwater environment.

The design of a band saw for underwater use presents a serious challenge to the designer. In the past, the military has used an oil driven hydraulic band saw for underwater construction which is similar to the band saw described in U.S. Pat. No. 4,001,937 and which was modified to use oil as the operating fluid. However, this oil driven hydraulic band saw creates serious logistics problems in that large quantities of oil have to be shipped and stored at sea. There is also a need for supply and return hoses from a surface ship limiting the diver's ability to handle the oil driven hydraulic band saw, particularly where heavy surge and strong currents exist. Further, leakage of the oil fluid from the band saw would contaminate the environment.

Another alternative would be to design a hydraulic band saw which utilizes seawater as the operating fluid. The design of a band saw which utilizes seawater as the hydraulic fluid presents a serious challenge to the designer because of the general corrosiveness of seawater on precision made parts in such band saws. The poor lubricity of seawater and a much lower viscosity for seawater than for conventional oil hydraulic fluid contribute to the problem of designing an efficient seawater operated hydraulic band saw.

With the disadvantages inherent in the design of an oil operated band saw and electrically powered band saws when utilized in an underwater environment, the present invention was conceived and one of its objectives is to provide a band saw for use in an underwater environment which utilizes seawater as the operating fluid and provides satisfactory results for the user.

It is another object of the present invention to provide a band saw designed such that seawater functions as the lubricant for wear surfaces.

It is still another object of the present invention to provide a band saw which utilizes seawater as the hydraulic fluid so as not to contaminate the environment.

Various other advantages and objectives of the present invention will become apparent to those skilled in the art as a more detailed description of the invention is set forth below.

SUMMARY OF THE INVENTION

The aforesaid and other objects of the invention are accomplished by a band saw which utilizes pressurized seawater as the working fluid. When an operator engages a trigger on a novel control handle and valve assembly, pressurized seawater enters the band saw through the control handle and valve assembly into a seawater powered motor. The seawater powered motor, in turn, drives a novel spur and pinion gear drive train which is connected to a saw blade drive wheel. Lubrication for this spur and pinion gear drive train is provided by seawater exhaust from the seawater motor. Also incorporated in the present invention are an improved driven wheel assembly which is seawater compatible, and an improved take-up assembly which facilitates the changing of saw blades.

BRIEF DESCRIPTION OF THE DRAWINGS

FIG. 2 is a bottom view of the band saw;

FIG. 3 is a front view of the band saw with a portion of the idler wheel area and drive wheel area illustrated in section;

FIG. 4 is a front view illustrating the valve and handle assembly of the band saw;

FIG. 5 is a sectional view illustrating the valve assembly of the valve and handle assembly;

FIG. 6 is a front view illustrating the trigger safety latch of the valve and handle assembly;

FIG. 7 is a view in section illustrating the drive gear assembly used with the band saw;

FIG. 8 is a view in section illustrating the take-up assembly used with the band saw; and FIG. 9 is a top view of the safety guard assembly of the present invention.

DESCRIPTION OF THE PREFERRED EMBODIMENT

Figure 1:
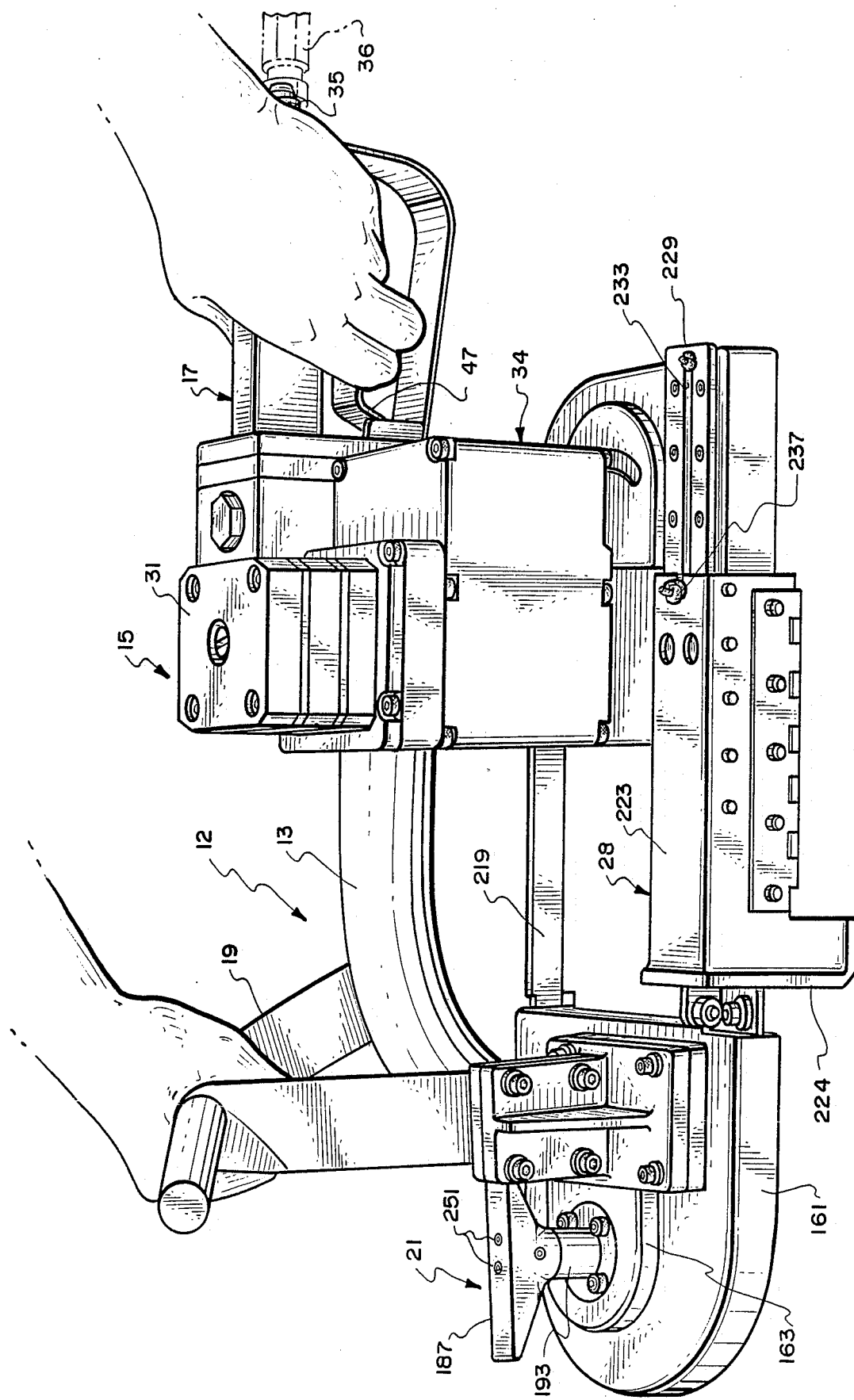
FIG. 1 is a perspective view of the preferred embodiment of the band saw constituting the present invention.

The preferred embodiment of the seawater hydraulic band saw constituting the present invention will now be discussed in some detail in conjunction with all of the figures of the drawings.

Referring first to FIGS. 1 and 2, there is shown a perspective view of a seawater hydraulic band saw 12 comprising a frame or housing 13 having mounted thereon a motor and drive gear assembly 15, a control handle assembly 17, an auxiliary handle 19, an idler take-up assembly 21, a pair of blade guide roller assemblies 23 illustrated in phantom and 25 for guiding a saw blade 27 and a safety guard assembly 28 to protect blade 27 when band saw 12 is non-operational and protect the operator when the band saw 12 is operational. Journalled underneath the frame assembly 13 is a drive wheel 29 connected in driving relationship to a seawater powered vane motor 31 by a drive train 33 (see FIG. 7) journalled within a drive train housing 34.

At this time it should be noted that vane motor 31 may be a 3.5 horsepower motor of the type described in U.S. Pat. No. 4,376,620 which utilizes pressurized seawater as an operating fluid It should also be noted that band saw 12 operates at cutting speeds of up to 175 feet per minute and band saw 12 has successfully cut rebar, synthetic line, steel plate and SD List 5 coaxial cable.

Referring now to FIGS. 1, 4, and 5 pressurized seawater to drive motor 31 is provided by a source, not shown, through a threaded inlet 35 connected to a supply hose 36, illustrated in phantom, and a passageway 37 to the inlet side of a valve assembly 39 within control handle assembly 17. Control handle assembly 17 includes an adapter block 40 attached to drive train housing 34 by bolts, not shown, while valve assembly 39 includes a valve 41 which has a stem 42 that is slidingly fitted in a cavity 43 within control handle assembly 17. There is attached to the front end of stem 42 a trigger pin 45 which is, in turn, connected to a trigger 47 rotatably affixed to control handle assembly 17, and which has a trigger safety latch 49, FIG. 6, to prevent the accidental engagement of trigger 47.

Stem 42 also has a cavity 51 at its rear end, and a conical shaped face 53 near its center which is held against a valve seat 55 by a spring 57. Spring 57 has one end mounted within cavity 51 and the opposite end abutting a spring cap 59 mounted within the rear portion of cavity 43. A seal 61 positioned between the inner surface of spring cap 59 and stem 42 prevents leakage of pressurized seawater into cavity 51.

Adjacent conical shaped face 53 is an indent 63 in stem 42 which provides a fluid flow path between the inlet and outlet sides of valve assembly 39. When an operator releases safety latch 49 and then engages trigger 47 which releases conical shaped face 53 from valve seat 55, pressurized seawater will flow from passageway 37 through an opening 62 in spring cap 59 and through indent 63 to a passageway 65 which connects the outlet side of valve assembly 39 to an inlet port, not shown, on motor 31 thereby activating motor 31 which, in turn, imparts rotational motion on drive wheel 29 through drive train 33.

There is mounted around an indent 68 near the front end of stem 42 a seal 69 which is secured by a retaining sleeve 71 and which prevents leakage of pressurized seawater from cavity 43. A retaining ring 75 is utilized to secure the stem 42 of valve 41 within cavity 43.

At this time it should be noted that the critical components of valve assembly 39, valve stem 42 and valve seat 55 were fabricated from materials resistant to the corrosive effects of seawater. Specifically, valve stem 42 was fabricated from stainless steel and valve seat 55 was fabricated from Torlon, a polymer manufactured by Amoco Chemical Corporation.

Referring now to FIGS. 3 and 7 seawater powered vane motor 31 has a shaft 77 journalled in drive train housing 34. Shaft 77 in turn has a spherical shaped surface enlarged region 78 at its end. The enlarged region 78 of shaft 77 is connected by a spline coupling 79 to a spherical shaped surface enlarged region 80 at the upper end of a spline shaft 81 which is journalled in drive train housing 34. Positioned within spline coupling 79 between shafts 77 and 81 is a coupling spacer 82 which ensures that spline coupling 79 is center equally between shafts 77 and 81. The spherical enlarged regions 78 and 80 compensate for possible non-alignment of motor shaft 77 with respect to spline shaft 81 when motor 31 is attached to drive train housing 34, thereby preventing axial or lateral loads from being transferred to motor shaft 77 when band saw 12 is operational.

There is also fixed on spline shaft 81 a pinion gear 83 which is in mesh with and drives a spur gear 85 fixed on an intermediate shaft 87. Shaft 87 which is journalled in housing 34 has fixed on its lower end a pinion gear 89 which is in mesh with and drives a spur gear 91 fixed on a drive shaft 93. Drive shaft 93 which is also journalled in housing 34 is supported by a pair of bearings 95 and 97, while shaft 87 is supported by a pair of bearings 99 and 101 and shaft 81 is supported by a pair of bearings 103 and 105.

At this time it should be noted that the critical components drive train 33 were fabricated from materials which are resistant to the corrosive effects of seawater. Specifically, shafts 81, 87, 93 and spline coupling 79 were fabricated from stainless steel; pinion gears 83 and 89 were fabricated from stainless steel; spur gears 85 and 91 and coupling spacer 82 were fabricated from Torlon; and bearings 95, 97, 99, 101, 103, and 105 were fabricated from Rulon, a polymer bearing material developed by Dixon Industries Corporation. It should also be noted that the gear reduction ratio provided by drive train 33 is 20:1.

Pressurized seawater to lubricate drive train 33 is provided by motor 31 through an exhaust port, not shown, on motor 31, through an opening 109 within housing 34 lubricating spline coupling 79 into a cavity 111 so as to lubricate the upper end of shafts 81 and 87. Pressurized seawater then passes through openings/passages 113 and 114, FIG. 7 into a cavity 115 lubricating gears 83 and 85, the lower end of shaft 81, the upper end of shaft 93 and that portion of shaft 87 within bearing 99. Pressurized seawater next passes through openings/passages 116 and 117, FIG. 7, within housing 34 into a cavity 118 lubricating gears 89 and 91 and that portion of shaft 93 within bearing 97 and then exits frame 34 through an opening/passage 119.

Referring now to FIG. 3 shaft 93 has a sprocket 121 attached to its lower end by a key retainer 123. A chain 125, FIG. 2, meshes with and is driven by sprocket 121 and, in turn, meshes with and drives a sprocket 127 which is fixed to drive wheel 29 by bolts 129. Drive wheel 29 is rotationally retained to one end of a stub shaft 131 by a washer 135 a cover member 137 and a screw 139 threaded into shaft 131. The opposite end of stub shaft 131 is mounted within a drive wheel housing 140 which is, in turn, attached to housing 34 by screws 141. There is mounted within an aperture 142 at the center of drive wheel 29 a pair of bearings 143 and 144 fabricated from Rulon which allow drive wheel 29 to rotate about shaft 131.

At this time, it should be noted that pressurized seawater exiting band saw 12 through opening 119 is used to remove cuttings and other debris away from chain 125 and the work area. Further, it should be noted that the rotation of the pinion and spur gears 83, 85, 89 and 91 and the location of passages 113, 114, 116, and 117, FIG. 7, within drive housing 34 enhance circulation of seawater within housing 34.

Drive wheel 29 has a rim 145 on its periphery which has attached thereto a pulley tire 146 and an abrasive strip 147. Abrasive strip 147, in turn, provides frictional drive to saw blade 27.

Turning now to FIGS. 2 and 3, there is shown an idler wheel assembly 149 which includes an idler/-driven wheel 151 which is rotationally retained to one end of a stub shaft 153 by a washer 155, a cover member 157 and a screw 159 threaded into shaft 153. The opposite end of stub shaft 153 is mounted within a driven wheel housing 161 which is, in turn, slidably mounted on a mounting plate 163. Plate 163 is attached to frame 13 by screws 165.

There is mounted within an aperture 166 at the center of driven wheel 151 bearings 167 and 168 fabricated from Rulon which allow driven wheel 151 to rotate about shaft 153.

Driven wheel 151 has a rim 169 on its periphery which has attached thereto a pulley tire 171 and an abrasive strip 173. Abrasive strip 173, in turn, provides frictional drive to saw blade 27.

Driven wheel housing 161 has a pair of slots 175 and 177 orientated to allow movement of housing 161 toward and away from drive wheel 29 in a plane perpendicular to the axes of wheels 29 and 151. A pair of retainer plates 179 and 181 respectively positioned below slots 175 and 177 and connected to plate 163 by screws 183 retain housing 161 in slidable engagement with plate 163. As is best illustrated in FIG. 8, there is slidably positioned within slot 175 a first guide bar 185 which is secured to plate 163 by retainer plate 179. Although not illustrated, a second guide bar is identically positioned within slot 177 with the pair of guide bars allowing housing 161 and wheel 151 to move toward and away from drive wheel 29, but prohibiting any sideways movement of housing 161 and wheel 151.

Idler take-up assembly 21 facilitates changing saw blades by moving driven wheel 151 toward drive wheel 29, then after replacement of saw blade 27 driven wheel 151 is moved away from drive wheel 29 to tension the saw blade. As shown in FIGS. 2 and 3, idler take-up assembly 21 includes a take-up handle 187, and a take-up shaft 189 which has one end thereof mounted within a hole 191 in take-up handle 187 thereby securing shaft 189 to handle 187. Affixed to plate 163 is a take-up pedestal 193 which has an aperture 195 which, in turn, has a pair of bearings 196 and 197 fabricated from Torlon that allow for rotational movement of shaft 189 within pedestal 193. Take-up pedestal 193 also has a pair of V shaped indentations 198 and 199 adapted to receive a spring loaded plunger 200 consisting of a set screw 251 threadably connected to take-up handle 187, a spring 253, and a plunger 255 adapted to fit within V shaped indentations 198 and 199. The spring loaded plunger 200 holds handle 187 in a fixed position when band saw 12 is operational or when saw blade 27 is being changed.

Take-up shaft 189 has at its bottom end and integrally formed therewith an approximately L shaped member 201, one leg 202 of which passes through an aperture 203 within a tension bar 205. A snap ring 207 secures tension bar 205 to take-up shaft 189. The arms 209 and 211 of tension bar 205 respectively each have one end of a pair of springs 213 and 215 connected thereto. The other end of each spring is connected to a spring anchor screw 217 threadably connected to driven wheel housing 161.

As illustrated in FIG. 3, idler take-up assembly 21 is shown in the position whereby saw blade 27 is tensioned and band saw 12 is operational. Rotation of handle 187 moves driven wheel housing 161 and driven wheel 151 toward drive wheel 29 reducing the tension on saw blade 27 thereby allowing for the removal and replacement of saw blade 27. The resilient connection of springs 213 and 215 in the tensioning direction provide for differences in saw blade length.

Referring now to FIG. 2, the path of the saw blade 27 from drive wheel 29 to driven wheel 151 takes it along a channel-like recess 218 in a strut member 219 which connects the wheel housings. Strut member 219 is a part of the integral housing 13 and makes a unitary structure with the wheel housings. The saw blade 27 is accordingly recessed in housing 13 for its entire run, except the cutting area between guide roller assemblies 23 and 25, where the blade is moving in the direction of the arrow 221. In this cutting area, the cutting edge of blade 27 is given a twist by blade guide 25 and kept that way for the length of the exposed run by blade guide 23. After passing blade guide 23, saw blade 27 returns to another orientation parallel to the axes of the wheels 29 and 151. In order to produce this twisting action, in which the cutting edge saw blade 27 is twisted outward away from the longitudinal axis of the tool, commercially available blade guides manufactured by Rockwell International and described in U.S. Pat. No. 4,001,937 were used.

Referring now to FIGS. 1 and 9, there is shown safety guard assembly 28 which includes a housing 223 having a work engaging surface 224 at the end nearest driven wheel 151, a roller 225 rotationally connected to housing 223 by a screw 227, and a guide member 229 connected to housing 13 by screws 231. Roller 225 is in movable engagement with a channel 233 in guide member 229 and has a groove 235 therein. An elastic cord 237, which has one end connected to an aperture 239 in guide member 229 and the opposite end connected to a notch 241 in housing 223, is in engagement with the groove 235 in roller 225. Elastic cord 237, in turn, keeps safety guard assembly 28 under tension and thus in the position illustrated in FIG. 1 when band saw 12 is non-operational and allows for the exposure of saw blade 27 to a work piece, not shown, whenever surface 224 engages the work piece.

What is claimed is:
1. A portable band saw which uses pressurized seawater as the operating fluid comprising:
   a drive wheel having a pulley tire on the periphery thereof, said pulley tire having an abrasive strip attached thereto;
   a driven wheel having a pulley tire on the periphery thereof, said pulley tire having an abrasive strip attached thereto;
   a continuous band-type saw blade mounted on said drive and driven wheels;
   motor means having an inlet port, an exhaust port, and a shaft, the inlet of said motor means being adapted for receiving pressurized seawater so as to activate said motor means thereby causing the shaft thereof to rotate;
   control means connected to the inlet port of said motor means and having a trigger, the trigger of said control means when engaged allowing pressurized seawater to pass through said control means to said motor means thereby activating said motor means;
   means for transmitting the rotational motion of the shaft of said motor means to said drive wheel, said transmitting means being lubricated by pressurized seawater provided through the exhaust port of said motor means;
   adjustment means for changing said saw blade by moving said driven wheel toward said drive wheel and thereby relaxing tension on said saw blade and then tightening said saw blade by moving said driven wheel away from said drive wheel; and
   frame means supporting said drive and driven wheels, said transmitting means, said control means, said motor means and said adjustment means.
2. The band saw of claim 1 wherein said control means comprises:
   a control handle assembly having an adapter block attached to said transmitting means, a cavity, an inlet passageway connected to said cavity and an outlet passageway connected between said cavity and the inlet port of said motor means;

a valve having a valve seat mounted within the cavity of said control handle assembly, a stem slidingly fitted within the cavity of said control handle assembly, and a spring;

said valve stem having a trigger pin at one end, an indent and a conical shaped face adjacent said indent with the spring of said valve being adapted to hold the conical shaped face of said valve stem against said valve seat; and said trigger being rotatably affixed to said control handle assembly and said trigger being connected to the trigger pin of said valve stem such that engagement of said trigger releases the conical shaped face of said valve stem from said valve seat allowing pressurized seawater to flow from the inlet passageway of said control handle assembly through the indent of said valve stem and the outlet passageway of said control handle assembly into the inlet port of said motor means.

3. The band saw of claim 2 wherein said valve stem is fabricated from stainless steel and said valve seat is fabricated from Torlon.

4. The band saw of claim 1 wherein said transmitting means comprises:

a drive train housing having said motor means attached thereto and a spherical shaped enlarged region of the shaft of said motor means journalled therein;

a spline shaft journalled within said drive housing, said spline shaft having a spherical shaped surface enlarged region at one end thereof;

a first pinion gear fixed on said spline shaft;

a spline coupling for connecting the spherical shaped surface enlarged regions of said motor means shaft and said spline shaft, said spline coupling having a coupling spacer positioned between said motor means shaft and said spline shaft;

an intermediate shaft journalled within said drive housing;

a first spur gear fixed on said intermediate shaft, said first spur gear being in mesh with said first pinion gear;

a second pinion gear fixed on said intermediate shaft;

a drive shaft journalled within said drive housing, said drive shaft being in rotational engagement with said drive wheel;

a second spur gear fixed on said drive shaft, said second spur gear being in mesh with said second pinion gear;

a first sprocket attached to one end of said drive shaft;

a second sprocket attached to said drive wheel; and a chain in mesh with said first and second sprockets.

5. The band saw of claim 4 wherein said spline shaft, said intermediate shaft, said drive shaft, said spline coupling, and said first and second pinion gears are each fabricated from stainless steel.

6. The band saw of claim 4 wherein said first and second spur gears, and said coupling spacer are each fabricated from Torlon.

7. The band saw of claim 1 wherein said adjustment means comprises:

a mounting plate attached to said frame means;

a driven wheel housing slidably mounted on said plate and having first and second slots orientated to allow movement of said housing toward and away from said drive wheel in a plane perpendicular to the axes of said drive and driven wheels;

a stub shaft having one end mounted within said driven wheel housing and having said driven wheel in rotational engagement with the opposite end thereof;

first and second guide bars, the first of which is slidably positioned in the first slot of said driven wheel housing and the second of which is slidably positioned in the second slot of said driven wheel housing;

first and second retainer plates positioned respectively below the first and second slots of said driven wheel housing and secured thereto so as to retain said driven wheel housing in slidable engagement with said mounting plate;

a take-up handle having a hole therein and a spring loaded plunger;

a take-up shaft having one end thereof mounted within the hole of said take-up handle and having at the opposite end thereof an L shaped member;

a take-up pedestal mounted on said plate and having an aperture and a pair of V shaped indentations, the aperture of said pedestal having a pair of bearings which allow for rotational movement of said take-up shaft within said pedestal, and the V shaped indentations adapted to receive the spring loaded plunger of said take-up handle;

a tension bar attached to the L shaped member of said shaft, said tension bar having first and second arms;

first and second spring anchor screws threadably connected to said driven wheel housing; and first and second springs, the first of which is connected between said first spring anchor screw and the first arm of said tension bar and the second of which is connected between said second spring anchor screw and the second arm of said tension bar.

8. The band saw of claim 1 further characterized by first and second blade guide roller assemblies attached to said frame means and having said saw blade passing therethrough, said first guide roller providing a twist to the cutting edge of said saw blade outward away from the longitudinal axis of said saw blade and said second guide roller returning said saw blade to an orientation parallel to the axes of said drive and driven wheel.

9. The saw blade of claim 1 further characterized by a safety guard assembly comprising;

a housing having a work engaging surface at the end nearest said driven wheel, and a notch at the opposite end;

a guide member attached to said frame means and having a channel and an aperture therein;

a roller rotationally mounted within said housing and having a groove therein;

said roller being in movable engagement with the channel of said guide member; and an elastic cord having one end connected to the notch in said housing and the opposite end connected to the aperture in said guide member, said elastic cord being in engagement with the groove of said roller.

10. A pressurized seawater powered band saw comprising:

a drive wheel having a pulley tire on the periphery thereof, said pulley tire having an abrasive strip attached thereto;

a driven wheel having a pulley tire on the periphery thereof, said pulley tire having an abrasive strip attached thereto;

a continuous band-type saw blade mounted on said drive and driven wheels;

a seawater powered motor having an inlet, an exhaust port, and a shaft, said shaft having a spherical shaped surface enlarged region at the end thereof;

a drive train housing having said seawater powered motor attached thereto and the shaft of said motor journalled therein;

a spline shaft journalled within said drive housing, said spline shaft having a spherical shaped surface enlarged region at one end thereof;

a first pinion gear fixed on said spline shaft;

a spline coupling for connecting the spherical shaped surface enlarged regions of said motor shaft and said spline shaft, said spline coupling having a coupling spacer positioned between said motor shaft and said spline shaft;

an intermediate shaft journalled within said drive housing;

a first spur gear fixed on said intermediate shaft, said first spur gear being in mesh with said first pinion gear;

a second pinion gear fixed on said intermediate shaft;

a drive shaft journalled within said drive housing, said drive shaft being in rotational engagement with said drive wheel;

a second spur gear fixed on said drive shaft, said second spur gear being in mesh with said second pinion gear;

a control handle assembly having an adapter block attached to said drive train housing, a cavity, an inlet passageway connected to said cavity and an outlet passageway connected between said cavity and the inlet port of said motor;

a valve having a valve seat mounted within the cavity of said control handle assembly, a stem slidingly fitted within the cavity of said control handle assembly, and a spring;

said valve stem having a trigger pin at one end, an indent and a conical shaped face adjacent said indent with the spring of said valve being adapted to hold the conical shaped face of said valve stem against said valve seat;

a trigger rotatably affixed to said control handle assembly, said trigger being connected to the trigger pin of said valve stem such that engagement of said trigger releases the conical shaped face of said valve stem from said valve seat allowing pressurized seawater to flow from the inlet passageway of said control handle assembly through the indent of said valve stem and the outlet passageway of said control handle assembly into the inlet of said motor; and a frame supporting said drive and driven wheels and said drive train housing.

11. The band saw of claim 10 wherein said spline shaft, said intermediate shaft, said drive shaft, said spline coupling, said valve stem and said first and second pinion gears are each fabricated from stainless steel.

12. The band saw of claim 11 wherein said first and second spur gears, said valve seat and said coupling spacer are each fabricated from Torlon.

13. The band saw of claim 11 further characterized by first and second blade guide roller assemblies attached to said frame and having said saw blade passing therethrough, said first guide roller providing a twist to the cutting edge of said saw blade outward away from the longitudinal axis of said saw blade and said second guide roller returning said saw blade to an orientation parallel to the axes of said drive and driven wheel.

14. The saw blade of claim 11 further characterized by a safety guard assembly comprising;

a housing having a work engaging surface at the end nearest said driven wheel, and a notch at the opposite end;

a guide member attached to said frame and having a channel and an aperture therein;

a roller rotationally mounted within said housing and having a groove therein;

said roller being in movable engagement with the channel of said guide member; and an elastic cord having one end connected to the notch in said housing and the opposite connected to the aperture in said guide member, said elastic cord being in engagement with the groove of said roller 15. The band saw of claim 11 further characterized by a first sprocket attached to one end of said drive shaft, a second sprocket attached to said drive wheel, and a chain in mesh with said first and second sprockets.

16. The band saw of claim 11 further characterized by an idler take-up assembly comprising:

a mounting plate attached to said frame;

a driven wheel housing slidably mounted on said plate and having first and second slots orientated to allow movement of said housing toward and away from said drive wheel in a plane perpendicular to the axes of said drive and driven wheels;

a stub shaft having one end mounted within said driven wheel housing and having said driven wheel in rotational engagement with the opposite end thereof;

first and second guide bars, the first of which is slidably positioned in the first slot of said driven wheel housing and the second of which is slidably positioned in the second slot of said driven wheel housing;

first and second retainer plates positioned respectively below the first and second slots of said driven wheel housing and secured thereto so as to retain said driven wheel housing in slidable engagement with said mounting plate;

a take-up handle having a hole therein and a spring loaded plunger;

a take-up shaft having one end thereof mounted within the hole of said take-up handle and having at the opposite end thereof an L shaped member;

a take-up pedestal mounted on said plate and having an aperture and a pair of V shaped indentations, the aperture of said pedestal having a pair of bearings which allow for rotational movement of said take-up shaft within said pedestal, and the V shaped indentations adapted to receive the spring loaded plunger of said take-up handle;

a tension bar attached to the L shaped member of said shaft, said tension bar having first and second arms;

first and second spring anchor screws threadably connected to said driven wheel housing; and first and second springs, the first of which is connected between said first spring anchor screw and the first arm of said tension bar and the second of which is connected between said second spring anchor screw and the second arm of said tension bar.

* * * * *